United States Patent
Kunimatsu et al.

(10) Patent No.: US 10,107,367 B2
(45) Date of Patent: Oct. 23, 2018

(54) CHAIN TENSIONER AND RELIEF VALVE UNIT

(71) Applicant: TSUBAKIMOTO CHAIN CO., Osaka-shi, Osaka (JP)

(72) Inventors: Kohei Kunimatsu, Osaka (JP); Yuji Kurematsu, Osaka (JP)

(73) Assignee: TSUBAKIMOTO CHAIN CO., Osaka-shi (JP)

( * ) Notice: Subject to any disclaimer, the term of this patent is extended or adjusted under 35 U.S.C. 154(b) by 171 days.

(21) Appl. No.: 15/089,910

(22) Filed: Apr. 4, 2016

(65) Prior Publication Data

US 2016/0290447 A1    Oct. 6, 2016

(30) Foreign Application Priority Data

Apr. 3, 2015 (JP) .................. 2015-076743

(51) Int. Cl.
| | | |
|---|---|---|
| *F16H 7/08* | (2006.01) | |
| *F16H 15/04* | (2006.01) | |
| *F16K 17/02* | (2006.01) | |
| *F16K 15/04* | (2006.01) | |

(52) U.S. Cl.
CPC ......... *F16H 7/0848* (2013.01); *F16H 7/0836* (2013.01); *F16K 15/04* (2013.01); *F16K 17/02* (2013.01); *F16H 2007/0806* (2013.01); *F16H 2007/0812* (2013.01); *F16H 2007/0814* (2013.01); *F16H 2007/0853* (2013.01); (Continued)

(58) Field of Classification Search
CPC .................. F16H 7/0848; F16H 7/0836; F16H 2007/0806; F16H 2007/0812; F16H 2007/0814; F16H 2007/0853; F16H 2007/0859; F16H 2007/0893; F16K 15/04; F16K 17/02
USPC ........................................ 474/110
See application file for complete search history.

(56) References Cited

U.S. PATENT DOCUMENTS

| | | | | |
|---|---|---|---|---|
| 5,637,047 A | * | 6/1997 | Schulze | ............... F16H 7/0848 |
| | | | | 474/110 |
| 5,700,213 A | | 12/1997 | Simpson et al. | |
| 5,707,309 A | | 1/1998 | Simpson | |

(Continued)

FOREIGN PATENT DOCUMENTS

| | | |
|---|---|---|
| JP | 10-306857 A | 11/1998 |
| JP | 2002-130401 A | 5/2002 |

(Continued)

*Primary Examiner* — William E Dondero
*Assistant Examiner* — Robert T Reese
(74) *Attorney, Agent, or Firm* — Westerman, Hattori, Daniels & Adrian, LLP (57) ABSTRACT

To provide a chain tensioner and a relief valve unit that enable a reduction in the number of parts to be machined and the number of assembling steps, reduce the amount of oil flowing out to the outside, and prevent damage on a check valve, without having to increase the size of the chain tensioner. The chain tensioner includes a check valve unit that suppresses reverse flow of oil flowing into an oil pressure chamber, and a relief valve unit that releases the oil when the pressure inside the oil pressure chamber reaches or exceeds a predetermined high pressure. The check valve unit is disposed as a valve element of the relief valve unit, and the relief valve unit and the check valve unit are formed integral with each other.

9 Claims, 8 Drawing Sheets

(52) U.S. Cl.
CPC .............. *F16H 2007/0859* (2013.01); *F16H 2007/0893* (2013.01)

(56) References Cited

U.S. PATENT DOCUMENTS

| | | | | |
|---|---|---|---|---|
| 5,967,921 | A * | 10/1999 | Simpson | F16H 7/08 474/110 |
| 6,352,487 | B1 * | 3/2002 | Tada | F01L 1/02 474/110 |
| 6,435,993 | B1 * | 8/2002 | Tada | F16H 7/0836 474/109 |
| 7,070,528 | B2 * | 7/2006 | Emizu | F16H 7/0836 474/109 |
| 2002/0052259 | A1 | 5/2002 | Nakakubo et al. | |
| 2002/0169042 | A1 | 11/2002 | Kurohata et al. | |
| 2006/0089221 | A1 | 4/2006 | Hashimoto et al. | |
| 2011/0256970 | A1 | 10/2011 | Nakano et al. | |
| 2017/0130807 | A1 * | 5/2017 | Kurematsu | F16H 7/0848 |

FOREIGN PATENT DOCUMENTS

| | | | |
|---|---|---|---|
| JP | 2002-235818 | A | 8/2002 |
| JP | 2002-327810 | A | 11/2002 |
| JP | 2006-125430 | A | 5/2006 |
| JP | 2011-226534 | A | 11/2011 |

\* cited by examiner

Related Art

CHAIN TENSIONER AND RELIEF VALVE UNIT

BACKGROUND OF THE INVENTION

1. Field of the Invention

The present invention relates to a chain tensioner that includes a tensioner body that has a cylindrical plunger bore with an open end, a cylindrical plunger that is slidably inserted into the plunger bore, biasing means, accommodated so as to freely expand and contract inside an oil pressure chamber formed between the plunger bore and the plunger, for biasing the plunger in a protruding direction of the plunge, this chain tensioner maintaining appropriate tension of a chain.

2. Description of the Related Art

It has been common practice to use a chain tensioner for maintaining appropriate tension of a chain. For example, a chain guide mechanism has been known, which slidably guides, by means of a guide shoe, a transmission chain such as an endless roller chain passing over respective sprockets of a crankshaft and a cam shaft inside an engine room, and which uses a chain tensioner to press a pivoting chain guide having the guide shoe to maintain appropriate tension.

Figure 8:
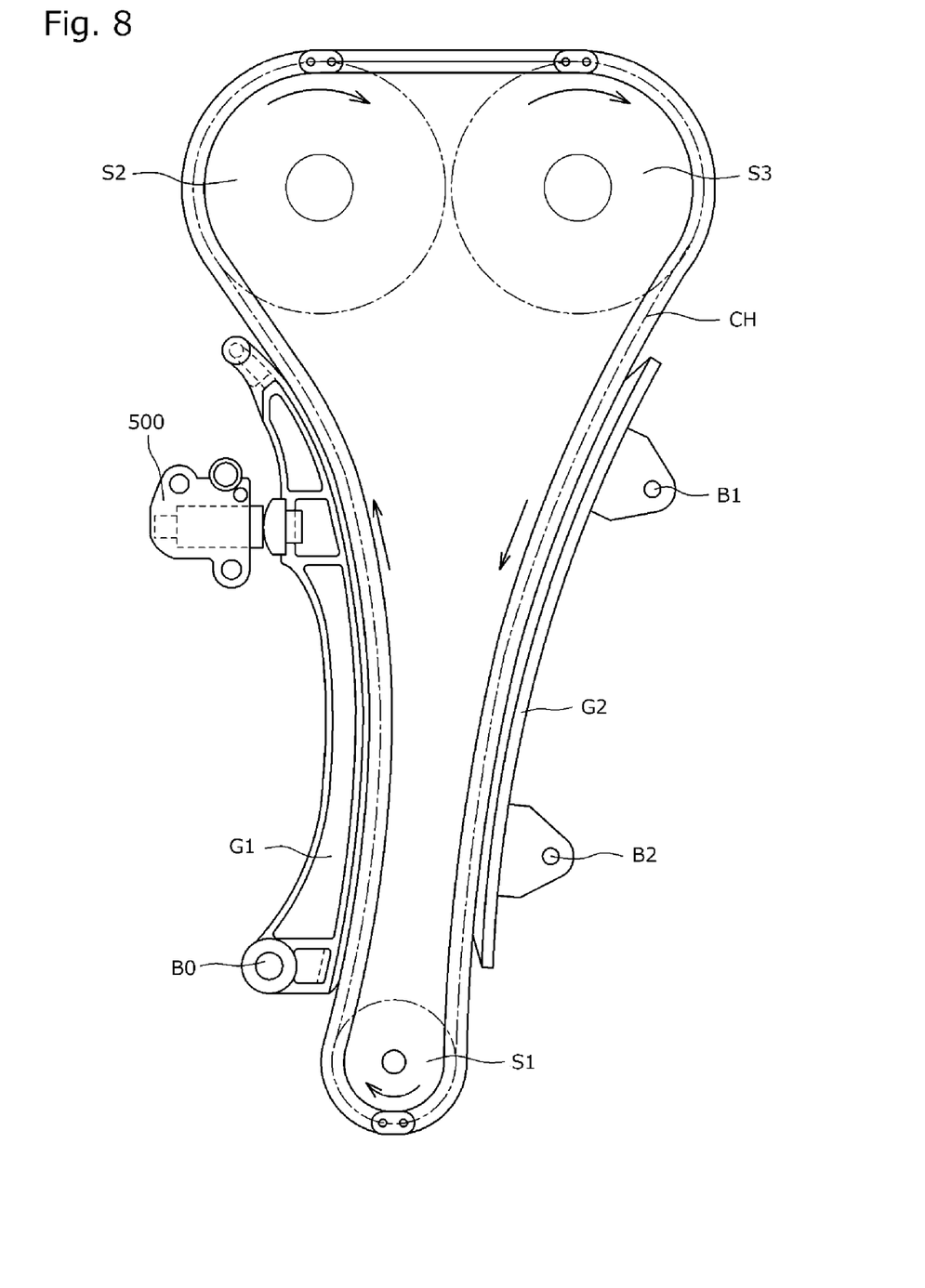
FIG. 8 is an explanatory diagram of the chain tensioner used in a chain guide mechanism of an engine.

For example, as shown in FIG. 8, an endless timing chain CH passes over a drive sprocket S1 attached to a crankshaft and a pair of driven sprockets S2 and S3 attached to cam shafts in an engine room. A chain guide mechanism is formed, wherein a pivoting chain guide G1 and a fixed chain guide G2 guide this timing chain CR.

The fixed chain guide G2 is fixed in position in the engine room with two mounting shafts B1 and B2, while the pivoting chain guide G1 is attached such as to be pivotable around the mounting shaft B0 in the plane in which the timing chain CH runs in the engine room.

The chain tensioner 500 presses the pivoting chain guide G1 and thereby maintains the tension of the timing chain CH at an appropriate level as well as reduces its vibration.

Figure 9:
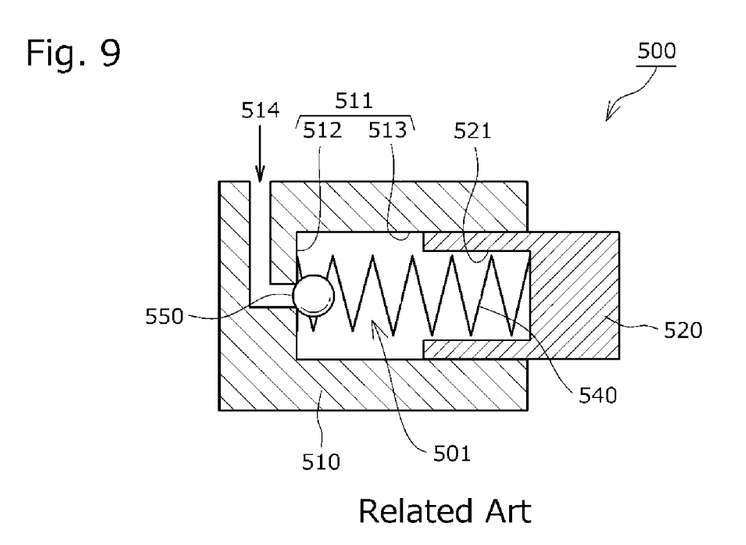
FIG. 9 is a schematic explanatory diagram of a conventional chain tensioner.

The known chain tensioner 500 used in such a chain guide mechanism includes, for example, as shown schematically in FIG. 9, a tensioner body 510 that has a cylindrical plunger bore 511 with an open end, a cylindrical plunger 520 that is inserted into the plunger bore 511 to freely slide against a cylindrical surface portion 513 of the plunger bore 511, and biasing means that biases the plunger 520 in a protruding direction of the plunger from the plunger bore 511.

The biasing means are formed by a coil spring 540 accommodated inside a cylindrical recess 521 in the cylindrical plunger 520 and compressed between the plunger and the bottom 512 of the plunger bore 511.

Oil is supplied from an oil supply hole 514 formed in the plunger bore 511, so that an oil pressure chamber 501 formed between the plunger bore 511 and the plunger 520 is filled with the oil, and that the plunger 520 is biased in the protruding direction of the plunger by the oil. A check valve 550 (schematically shown as a check ball) stops the oil from flowing out from the oil supply hole 514.

As the plunger 520 reciprocates, the oil flows through a small gap between the plunger 520 and the plunger bore 511, and the flow resistance provides the damping effect of slowing down the reciprocal movement of the plunger 520.

In such a chain tensioner, in the event of an excessive tension developed in the timing chain during use, the pressure in the oil pressure chamber will be too high, which could generate noise or vibration, or cause damage on the timing chain.

To prevent such a situation, chain tensioners provided with a relief valve for relieving pressure when the pressure inside the oil pressure chamber reaches or exceeds a predetermined limit have been known (see Japanese Patent Application Laid-open Nos. 2002-327810, 2011-226534, 2002-130401, 2002-235818, and 2006-125430, etc).

SUMMARY OF THE INVENTION

The chain tensioner known from Japanese Patent Application Laid-open Nos. 2002-327810, 2011-226534 and the like has its relief valve provided to the tensioner body via an additional oil passage and not disposed inside the plunger bore. Therefore, the chain tensioner itself is increased in size, and so are the number of parts to be machined and the number of assembling steps.

The chain tensioner known from Japanese Patent Application Laid-open Nos. 2002-130401, 2002-235818, 2006-125430 and the like has its relief valve disposed inside the plunger bore and so a size increase of the chain tensioner itself is avoided. On the other hand, the internal structure of the plunger is more complex and therefore the number of assembling steps is increased.

Another problem is that, since the oil released by the relief valve flows out to the outside, more oil is consumed, and accordingly the oil pump needs higher power.

Moreover, in known chain tensioners including those of Japanese Patent Application Laid-open Nos. 2002-327810, 2011-226534, 2002-130401, 2002-235818, and 2006-125430, etc, the valve is configured such that the check ball moves inside the check valve. Therefore, in an operating condition wherein the pressure inside the oil pressure chamber rises suddenly, the check baLl sits on the check valve seat with a large impact immediately before the relief valve relieves the pressure, because of which there was a possibility that the check valve function could be deteriorated due to damage on the check ball or check valve seat.

An object of the present invention is to solve these problems and provide a chain tensioner and a relief valve unit that enable a reduction in the number of parts to be machined and the number of assembling steps, reduce the amount of oil flowing out to the outside, and prevent damage on the check valve, without having to increase the size of the chain tensioner.

The chain tensioner of the present invention includes: a tensioner body that has a cylindrical plunger bore with an open end; a cylindrical plunger that is slidably inserted into the plunger bore; biasing means, accommodated so as to freely expand and contract inside an oil pressure chamber formed between the plunger bore and the plunger, for biasing the plunger in a protruding direction of the plunger; a check valve unit that suppresses reverse flow of oil flowing into the oil pressure chamber; and a relief valve unit that releases the oil when pressure inside the oil pressure chamber reaches or exceeds a predetermined high pressure, the check valve unit being disposed as a valve element of the relief valve unit, and the relief valve unit and the check valve unit being formed integral with each other. The problems described above are solved by this feature.

The relief valve unit according to the present invention is a relief valve unit incorporated in a chain tensioner and includes: a relief sleeve that slidably holds therein a check valve unit; a relief valve seat that opens and closes as the check valve unit slides; and a unit pressing mechanism for pressing the check valve unit toward the relief valve seat. The problems described above are solved by this feature.

In the chain tensioner according to claim 1, the check valve unit is disposed as a valve element of the relief valve unit, and the relief valve unit and the check valve unit are formed integral with each other. Since the relief valve is disposed inside the plunger bore, the size of the chain tensioner itself is not increased, and neither is the number of parts to be machined.

Since the check valve unit is disposed as a valve element of the relief valve unit, and the relief valve unit and the check valve unit are formed integral with each other, they can be assembled in one piece into the tensioner after assembling the relief valve unit in advance. Thus, the number of assembling steps can be reduced.

Also, the tensioner is configured such that the pressure is relieved by the relief valve unit toward the side from which the oil is supplied, so that the amount of oil flowing out to the outside can be reduced, and, since the pressure difference between the oil pressure chamber and the pressure relief side is smaller, the speed at which the relief valve unit returns to its closed state can be increased.

Moreover, even when the relief valve unit is activated before the oil supply is started, such as when starting the engine, the oil is circulated rather than flowing out to the outside because of the structure in which the pressure is relieved toward the side from which the oil is supplied, and therefore, rattling at the start of the engine can be reduced.

According to the configuration set forth in claim 2, the relief valve unit includes a relief sleeve that slidably holds therein the check valve unit, a relief valve seat that opens and closes as the check valve unit slides, and a unit pressing mechanism that presses the check valve unit toward the relief valve seat. Therefore, in an operating condition wherein the pressure inside the oil pressure chamber rises suddenly, the check valve seat moves at the moment when the check ball sits on the check valve seat and the impact is absorbed by the unit pressing mechanism. Damage on the check ball or the check valve seat is thus prevented, and deterioration of the check valve function can be prevented.

According to the configuration set forth in claim 3, the check valve unit includes a check ball, a retainer holding therein the check ball, and a check valve seat that opens and closes as the check ball sits thereon and separates therefrom, and the retainer is configured to sit on the relief valve seat of the relief valve unit. This way, the check valve unit can be incorporated into the relief valve unit as a valve element only by giving the retainer a prescribed outer shape, so that the number of parts to be machined or the number of assembling steps is not increased.

Also, the number of components can be reduced as compared to known counterparts that have a check valve unit separately from a relief valve unit.

According to the configuration set forth in claim 4, the relief sleeve includes a release section that is on a rear side of the relief valve seat and causes the oil, which is released when the pressure reaches or exceeds a predetermined high pressure, to flow toward an outer circumferential surface of the relief sleeve. Thus the oil released when the pressure reaches or exceeds a predetermined high pressure smoothly circulates from the outer circumferential surface of the relief sleeve toward the side where the oil is supplied, and accordingly the amount of oil flowing out to the outside can be reduced.

According to the configuration set forth in claim 5, the relief valve unit is disposed on a bottom part of the plunger bore, with the relief valve seat being oriented toward the plunger. When applied to chain tensioners of the type that supplies oil from the bottom side of the plunger bore, the number of parts to be machined and the number of assembling steps are reduced, and so is the amount of oil flowing out to the outside, as well as damage on the check valve can be prevented, without having to increase the size of the chain. tensioner.

According to the configuration set forth in claim 6, the plunger includes an oil reservoir chamber inside, which communicates with the oil supply hole, with the relief valve unit disposed inside the oil reservoir chamber, and with an oil passage formed between the outer circumference of the relief sleeve and the inner circumference of the plunger for causing released oil to circulate back to the oil reservoir chamber. When applied to chain tensioners of the type that has an oil reservoir chamber inside the plunger, the number of parts to be machined and the number of assembling steps are reduced, and so is the amount of oil flowing out to the outside, as well as damage on the check valve can be prevented, without having to increase the size of the chain tensioner.

Moreover, the oil can circulate back to the oil reservoir chamber when the check valve opens, so that oil loss from the oil reservoir chamber can be reduced.

According to the configuration set forth in claim 7, the relief valve unit is formed to extend over the entirety of the oil reservoir chamber, with an oil reservoir space being formed inside the relief sleeve. When applied to chain tensioners of the type in which an oil reservoir chamber is formed by inserting a sleeve inside the plunger, the number of parts to be machined and the number of assembling steps are reduced, and so is the amount of oil flowing out to the outside, as well as damage on the check valve can be prevented, without having to increase the size of the chain tensioner.

Also, since the relief sleeve of the relief valve unit serves also as the sleeve for forming the oil reservoir chamber, the number of components and the number of assembling steps can further be reduced.

According to the configuration set forth in claim 8, the relief sleeve includes a sleeve connection hole in a rear side face of a sliding range of the check valve unit, this sleeve connection hole connecting the outer circumference of the relief sleeve with the oil reservoir space on the inner side of the relief sleeve. Since the oil can smoothly circulate back to the oil reservoir chamber through the sleeve connection hole, oil loss from the oil reservoir chamber can further be reduced.

According to the configuration set forth in claim 9, the relief valve unit is disposed slidable inside the plunger, with the relief valve seat of the relief valve unit being oriented toward a direction in which the plunger protrudes. When applied to chain tensioners of the type that supplies oil from the bottom side of the plunger bore and that has an oil reservoir chamber inside the plunger, the number of parts to be machined and the number of assembling steps are reduced, and so is the amount of oil flowing out to the outside, as well as damage on the check valve can be prevented, without having to increase the size of the chain tensioner.

Also, since the relief sleeve of the relief valve unit serves also as the sleeve for forming the oil reservoir chamber, the number of components and the number of assembling steps can further be reduced.

The relief valve unit according to claim 10 includes a relief sleeve that slidably holds therein the check valve unit, a relief valve seat that opens and closes as the check valve unit slides, and a unit pressing mechanism that presses the check valve unit toward the relief valve seat. Since the relief valve unit and the check valve unit are formed integral with each other, they can be assembled and united before incorporated into the chain tensioner, and thus the number of assembling steps can be reduced.

According to the configuration set forth in claim 11, the relief sleeve includes a release section that is on a rear side of the relief valve seat and that causes the oil, which is released when the pressure reaches or exceeds a predetermined high pressure, to flow toward an outer circumferential surface of the relief sleeve. When incorporated in the chain tensioner, in use, the oil released when the pressure reaches or exceeds a predetermined high pressure smoothly circulates from the outer circumferential surface of the relief sleeve toward the side where the oil is supplied, and accordingly the amount of oil flowing out to the outside can be reduced.

According to the configuration set forth in claim 12, the check valve unit includes a check ball, a retainer holding therein the check ball, and a check valve seat that opens and closes as the check ball sits thereon and separates therefrom, and the retainer is configured to sit on the relief valve seat of the relief valve unit. This way, the check valve unit can be incorporated into the relief valve unit as a valve element only by giving the retainer a prescribed outer shape, so that the number of parts to be machined or the number of assembling steps is not increased.

BRIEF DESCRIPTION OF THE DRAWINGS

FIG. 2A is a plan view, FIG. 2B is a front view, FIG. 2C is a perspective view.

FIG. 4A is a plan view, FIG. 4B is a front view, FIG. 4C is a bottom view.

DESCRIPTION OF THE PREFERRED EMBODIMENTS

[Embodiment 1]

A chain tensioner 100 and a relief valve unit 160 according to a first embodiment of the present invention will be described with reference to the drawings.

Figures 1A, 1B:
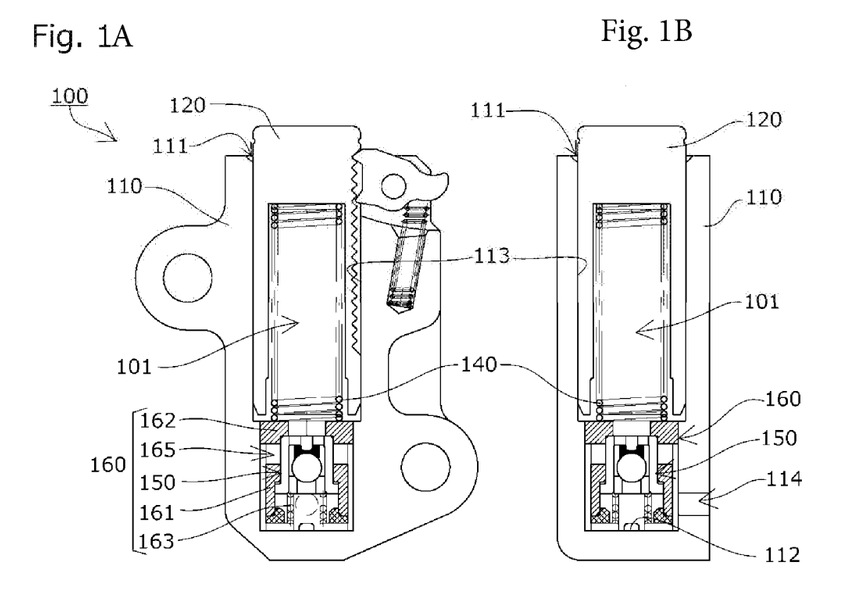
FIG. 1A is a front cross-sectional view and FIG. 1B is a side cross-sectional view of a chain. tensioner according to a first embodiment of the present invention.

The chain tensioner 100 according to a first embodiment of the present invention includes, as shown in FIG. 1A and FIG. 1B, a tensioner body 110 that has a cylindrical plunger bore 111 with an open end, a cylindrical plunger 120 that is slidably inserted into the plunger bore 111, and a coil spring 140 that is biasing means, accommodated to freely expand and contract inside an oil pressure chamber 101 formed between the plunger bore 111 and the plunger 120, for biasing the plunger 120 in a protruding direction of the plunger 120.

A relief valve unit 160 is provided at the bottom 112 of the plunger bore 111 of the tensioner body 110, and an oil supply hole 114 is provided near the bottom 112.

The chain tensioner 100 according to this embodiment is a type known as a ratchet tensioner, which includes a ratchet portion on an outer circumferential surface of the plunger 120. This ratchet portion engages with a pawl pivotably attached to the tensioner body 110 in a cut-off portion of the cylindrical surface 113, thereby to restrict the protruding and retracting movement of the plunger 120.

This ratchet mechanism may have any known structure and operate as known, and the tensioner need not necessarily be a ratchet type, and so it will not be described in detail.

The relief valve, unit 160 includes, as shown in FIG. 2A to FIG. 2D, a relief sleeve 161 that slidably holds therein. a check valve unit 150, a relief valve seat 162 that opens and closes as the check valve unit 150 slides, a unit pressing spring 163 that is a unit pressing mechanism for pressing the check valve unit 150 toward the relief valve seat 162, and a unit pressing spring holder 164 that supports and secures one end of the unit pressing spring 163.

The relief sleeve 161 includes, on the rear side of the relief valve seat 162, release holes 165 that are openings for causing the oil, which is released when the pressure reaches or exceeds a predetermined high pressure, to flow toward the outer circumferential surface of the relief sleeve 161. The relief sleeve 161 has a smaller diameter than the relief valve seat 162 from the release holes 165 downward.

Bottom grooves 167 are provided at the bottom of the unit pressing spring holder 164 for allowing smooth oil passage.

Figure 2A:
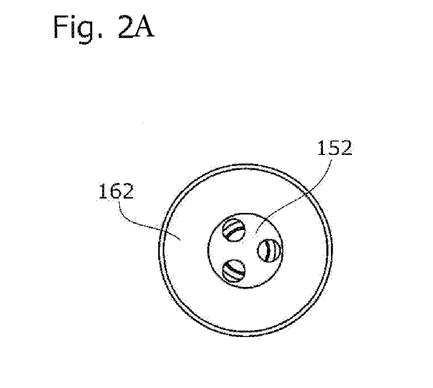
Figure 2B:
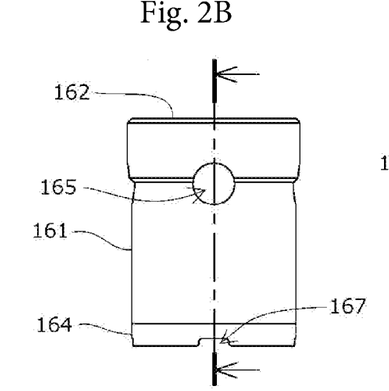
Figure 2C:
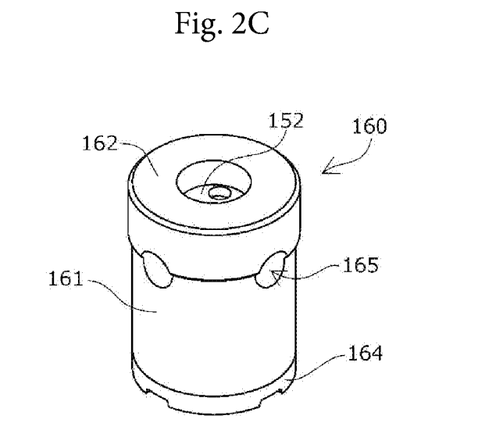
Figure 2D:
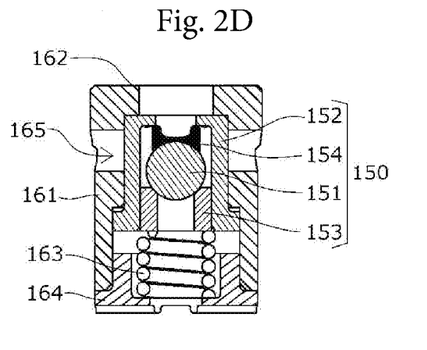
FIG. 2D is a cross-sectional view of a relief valve unit according to the first embodiment of the present invention.

The check valve unit 150 includes a check ball 151, a retainer 152 holding the check ball 151 inside, a check valve seat 153 that opens and closes as the check ball 151 sits thereon and separates therefrom, and a ball pressing spring 154 that lightly presses the check ball 151 toward the check valve seat 153 inside the retainer 152.

The retainer 152 has a cylindrical outer shape and is configured to sit on the relief valve seat 162 of the relief valve unit 160.

How the chain tensioner 100 and relief valve unit 160 according to the first embodiment of the present invention configured as described above operate will be explained.

When the plunger 120 protrudes, the oil supplied from the oil supply hole 114 flows in from the outer circumference of the relief sleeve 161 via the bottom grooves 167 below the unit pressing spring holder 164, reaches the check valve unit 150, pushes the check ball 151 up from the check valve seat 153, and enters the oil pressure chamber 101.

When the plunger 120 is pressed in to retract, the pressure inside the oil pressure chamber 101 rises, whereby the check ball 151 is pressed against the check valve seat 153, and the oil is stopped from flowing out of the check valve unit 150. The pressure then acts to press the check valve unit 150 itself downward against the pressing force of the unit pressing spring 163.

When the pressure inside the oil pressure chamber 101 reaches or exceeds a predetermined high pressure, the unit pressing spring 163 is compressed and the entire check valve unit 150 retracts, which causes the retainer 152 to separate from the relief valve seat 162 of the relief valve unit 160, thus relieving the pressure inside the oil pressure chamber 101.

In this embodiment, as shown, the relief valve seat 162 is formed in a concave shape, and closed by the retainer 152 that fits therein to a predetermined depth. That is, with this structure, the pressure inside the oil pressure chamber 101 is relieved after the retainer 152 has retracted until it is disengaged, which means that pressure leakage when the valve is closed is minimized.

When the pressure inside the oil pressure chamber 101 suddenly rises to or exceeds a predetermined high pressure, the contact pressure between the check ball 151 and the check valve seat 153 will increase rapidly.

If the pressure suddenly rises to or exceeds a predetermined high pressure in a state where the check ball 151 is not in contact with the check valve seat 153, the check ball 151 will collide against the check valve seat 153.

Since the check valve seat 153 retracts at this time, the impact caused by a sudden increase in the contact pressure or collision between the check ball 151 and the check valve seat 153 can be mitigated, so that deterioration of the check valve function due to damage on the check ball or check valve seat can be prevented.

Also, since the relief valve unit 160 is in one piece with the check valve unit 150 as shown in FIG. 2A to FIG. 2D, and can be prepared in advance as a single component as shown in FIG. 2A to FIG. 2D, the number of parts of the tensioner body 110 or the plunger 120 that need to be machined, and the number of process steps of assembling the chain tensioner 100 can be greatly reduced.

As the retainer 152 separates from the relief valve seat 162 to relieve the pressure inside the oil pressure chamber 101, the oil flows out of the oil pressure chamber 101 through the release holes 165 to the outer circumferential surface of the relief sleeve 161, and thus the oil circulates toward the oil supply hole 114 without flowing out to the outside.

When the pressure inside the oil pressure chamber 101 reduces to or below a predetermined level, the retainer 152 is again moved by the unit pressing spring 163 and sits on the relief valve seat 162, to keep it shut and maintain the pressure inside.

Since the pressure is relieved by the relief valve unit 160 toward the side from which the oil is supplied from the oil supply hole 114 in this structure, the pressure difference between the oil pressure chamber and the pressure relief side is smaller as compared to conventional structures wherein the pressure is relieved out to the outside with a relief valve, and therefore the speed at which the relief valve unit 160 returns to its closed state is increased.

In this embodiment, the unit pressing spring holder 164 is provided to the relief valve unit 160 so that they can be prepared as a single component in advance. Alternatively, the unit pressing spring holder 164 may be omitted, and the unit pressing spring 163 may be directly held by the bottom 112 of the plunger bore 111, and the relief valve seat 162 may be fixedly fitted in the plunger bore 111.

Also, while the oil supply hole 114 is provided in the cylindrical surface 113 in FIG. 1B, it may be provided in the bottom 112.

[Embodiment 2]

A chain tensioner 200 and a relief valve unit 260 according to a second embodiment of the present invention will be described with reference to the drawings.

Figures 3A, 3B:
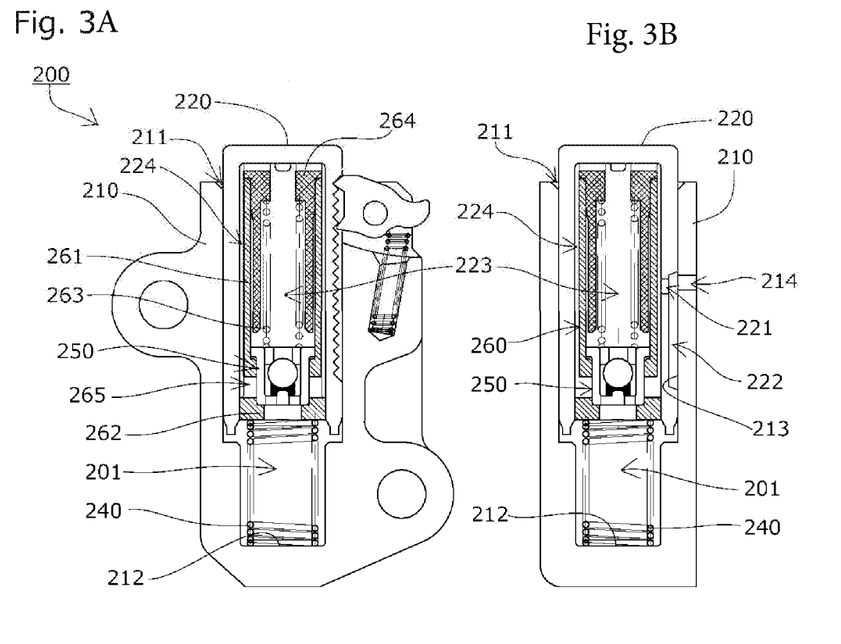
FIG. 3A is a front cross-sectional view and FIG. 3B is a side cross-sectional view of a chain tensioner according to a second embodiment of the present invention.

The plunger 220 of the chain tensioner 200 has an oil reservoir chamber 223 inside, as shown in FIG. 3A and FIG. 3B, which is communicated with the oil supply hole 214 via a supply passage 222 and a plunger hole 221. The relief valve unit 260 is disposed inside the oil reservoir chamber 223, and an oil passage 224 is formed between the outer circumference of the relief sleeve 261 and the inner circumference of the plunger 220 for causing released oil to circulate back to the oil reservoir chamber 223.

The relief valve unit 260 is formed to extend over the entirety of the oil reservoir chamber 223 as shown in FIG. 4A to FIG. 4D and configured similarly to the relief valve unit 160 according to the first embodiment (with reference numerals starting with number 2 as the hundred's digit).

This relief valve unit 260 is disposed in the oil reservoir chamber 223 inside the plunger 220, and an oil reservoir space is formed inside the relief sleeve 261.

The coil spring 240 that is biasing means for biasing the plunger 220 in a protruding direction of the plunger is formed to apply pressure, with its one end held on the bottom 212 of the plunger bore 211 of the tensioner body 210. The oil pressure chamber 201 is formed at the bottom 212.

The chain tensioner 200 according to this embodiment is also a type known as a ratchet tensioner. The ratchet mechanism may have any known structure and operate as known, and the tensioner need not necessarily be a ratchet type, and so it will not be described in detail.

How the chain tensioner 200 and relief valve unit 260 according to the second embodiment of the present invention configured as described above operate will be explained.

Oil is supplied from the oil supply hole 214 to the oil reservoir chamber 223 via the supply passage 222, plunger hole 221, oil passage 224, and bottom grooves 267 of the unit pressing spring holder 264.

When the plunger 220 protrudes, the oil inside the oil reservoir chamber 223 presses the check ball 251 down from the check valve seat 253 and flows into the oil pressure chamber 201.

When the plunger 220 is pressed in to retract, the pressure inside the oil pressure chamber 201 rises, whereby the check ball 251 is pressed against the check valve seat 253, and the oil is stopped from flowing out of the check valve unit 250. The pressure then acts to press the check valve unit 250 itself upward against the pressing force of the unit pressing spring 263.

When the pressure inside the oil pressure chamber 201 reaches or exceeds a predetermined high pressure, the unit pressing spring 263 is compressed and the entire check valve unit 250 retracts, which causes the retainer 252 to separate from the relief valve seat 262 of the relief valve unit 260, thus relieving the pressure inside the oil pressure chamber 201.

Figure 4A:
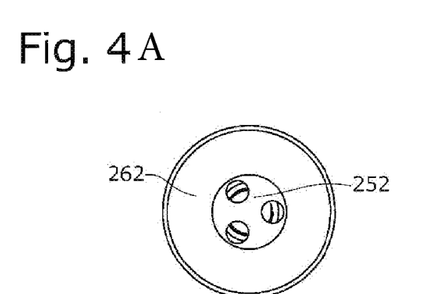
Figure 4B:
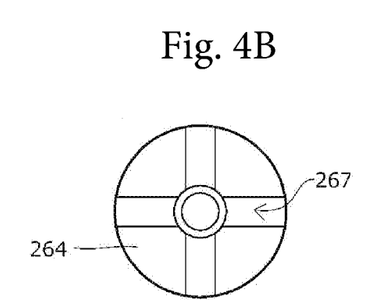
Figure 4C:
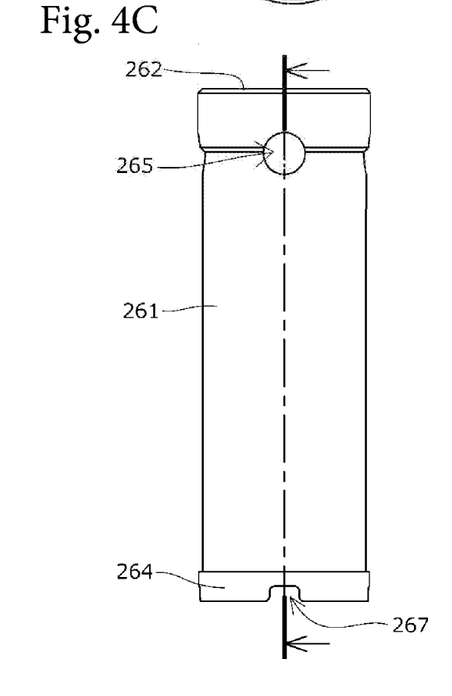
Figure 4D:
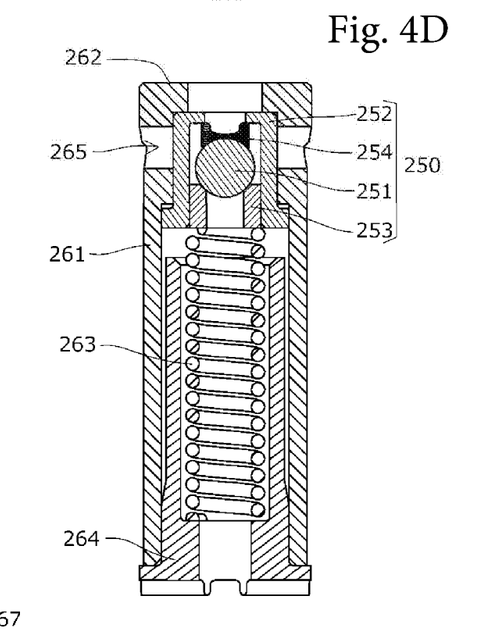
FIG. 4D is a cross-sectional view of a relief valve unit according to the second embodiment, of the present invention.

In this embodiment, similarly to the first embodiment, the relief valve seat 262 is formed in a concave shape, and closed by the retainer 252 that fits therein to a predetermined depth. That is, with this structure, the pressure inside the oil pressure chamber 201 is relieved after the retainer 252 has retracted until it is disengaged, which means that pressure leakage when the valve is closed is minimized.

As the retainer 252 separates from the relief valve seat 262 to relieve the pressure inside the oil pressure chamber 201, the oil flows out of the oil pressure chamber 201 through the release holes 265 into the oil passage 224 on the outer circumferential surface of the relief sleeve 261, and thus the oil circulates back to the oil reservoir chamber 223 through the bottom grooves 267 of the unit pressing spring holder 264 without flowing out to the outside.

When the pressure inside the oil pressure chamber 201 reduces to or below a predetermined level, the retainer 252 is again moved by the unit pressing spring 263 and sits on the relief valve seat 262, to keep it shut and maintain the pressure inside.

In this embodiment, the unit pressing spring holder 264 is provided to the relief valve unit 260 so that they can be prepared as a single component in advance. Alternatively, the unit pressing spring holder 264 may be omitted, and the unit pressing spring 263 may be directly held by the distal end of the plunger 220, and the relief valve seat 262 may be fixedly fitted in the plunger 220.

Figure 5:
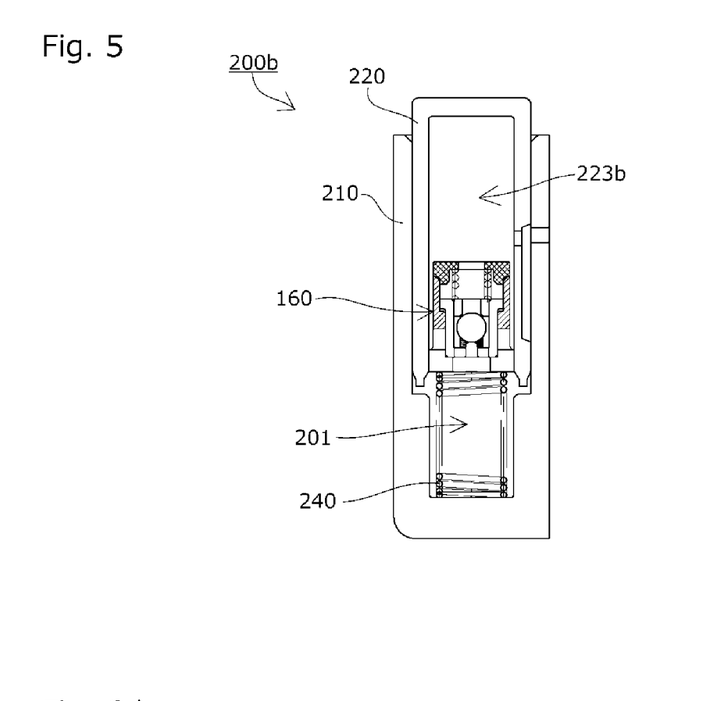
FIG. 5 is a side cross-sectional view of a variation example of the chain tensioner according to the second embodiment of the present invention.

Alternatively, as in the chain tensioner 200b shown in FIG. 5, the relief valve unit 160 similar to that of the first embodiment may be used to increase the capacity of the oil reservoir chamber 223b.

[Embodiment 3]

A chain tensioner 300 according to a third embodiment of the present invention will be described with reference to the drawings.

Figure 6A:
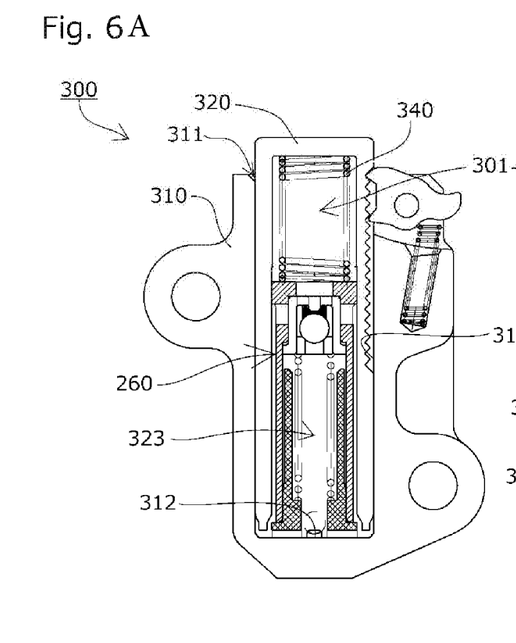
FIG. 6A is a front cross-sectional view and FIG. 6B is a side cross-sectional view of a chain tensioner according to a third embodiment of the present invention.
Figure 6B:
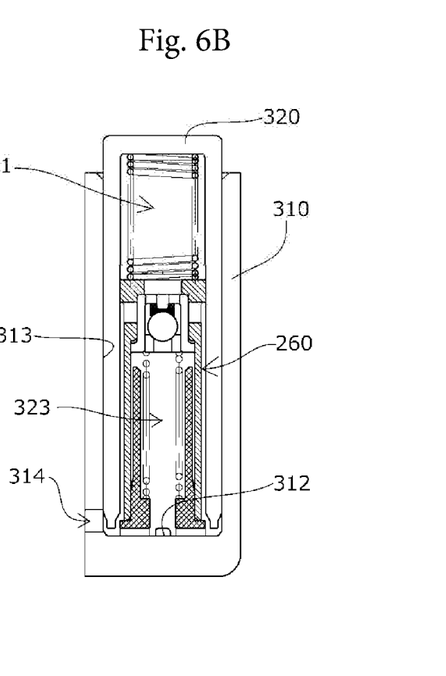

The chain tensioner 300 according to the third embodiment of the present invention includes, as shown in FIG. 6A and FIG. 6B, similarly to the first embodiment, a tensioner body 310 having a cylindrical plunger bore 311 with an open end, a cylindrical plunger 320 slidably inserted in the plunger bore 311, and a coil spring 340 that is biasing means, accommodated so as to freely expand and contract inside an oil pressure chamber 301 formed between the plunger bore 311 and the plunger 320, for biasing the plunger 320 in the protruding direction of the plunger.

The same relief valve unit 260 as that of the second embodiment shown in FIG. 4A to FIG. 4D is disposed inside the plunger bore 311 of the tensioner body 310 such as to be slidable into the plunger 320 from the bottom 312, with the relief valve seat 262 of the relief valve unit being oriented toward the direction a which the plunger 320 protrudes. An oil supply hole 314 is provided near the bottom 312.

Thus the oil pressure chamber 301 is formed inside the plunger 320 on the side toward which the plunger protrudes, while the oil reservoir chamber 323 is formed at the bottom 312 of the plunger bore 311 by the oil reservoir space formed inside the relief sleeve 261 of the relief valve unit 260.

The chain tensioner 300 according to this embodiment is also a type known as a ratchet tensioner. The ratchet mechanism may have any known structure and operate as known, and the tensioner need not necessarily be a ratchet type, and so it will not be described in detail.

How the chain tensioner 300 according to the third embodiment of the present invention configured as described above operates will be explained.

When the plunger 320 protrudes, the oil supplied from the oil supply hole 314 flows in from the outer circumference of the relief sleeve 261 via the bottom grooves 267 below the unit pressing spring holder 264, reaches the check valve unit 250, pushes the check ball 251 up from the check valve seat 253, and enters the oil pressure chamber 301.

When the plunger 320 is pressed in to retract, the pressure inside the oil pressure chamber 201 rises, whereby the check ball 251 is pressed against the check valve seat 253, and the oil is stopped from flowing out of the check valve unit 250. The pressure then acts to press the check valve unit 250 itself downward against the pressing force of the unit pressing spring 263.

When the pressure inside the oil pressure chamber 301 reaches or exceeds a predetermined high pressure, the unit pressing spring 263 is compressed and the entire check valve unit 250 retracts, which causes the retainer 252 to separate from the relief valve seat 262 of the relief valve unit 260, thus relieving the pressure inside the oil pressure chamber 301.

As the retainer 252 separates from the relief valve seat 262 to relieve the pressure inside the oil pressure chamber 301, the oil flows out of the oil pressure chamber 301 through the release holes 265 to the outer circumferential surface of the relief sleeve 261, and thus the oil circulates back to the oil reservoir chamber 323 through the oil supply hole 314 and the bottom grooves 267 of the unit pressing spring holder 264 without flowing out to the outside.

When the pressure inside the oil pressure chamber 301 reduces to or below a predetermined level, the retainer 252 is again moved by the unit pressing spring 263 and sits on the relief valve seat 262, to keep it shut and maintain the pressure inside.

While the oil supply hole 314 is provided in the cylindrical surface 313 in this embodiment, it may be provided in the bottom 312.

Figure 7:
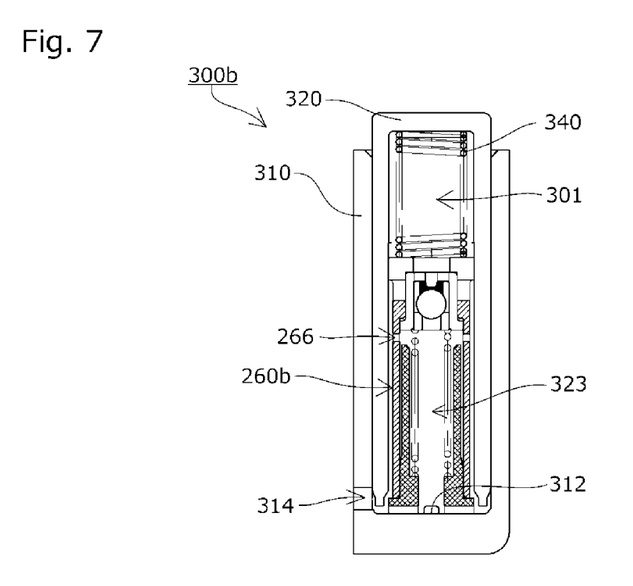
FIG. 7 is a side cross-sectional view of a variation example of the chain tensioner according to the third embodiment of the present invention.

Alternatively, as in the chain tensioner 300b shown in FIG. 7, a relief valve unit 260b that has a sleeve connection hole 266 in the rear side face of the relief sleeve 261 of the sliding range of the check valve unit 250 may be used, with this sleeve connection hole connecting the outer circumference of the relief sleeve with the oil reservoir space on the inners side of the relief sleeve, in order to increase the amount of oil circulating back to the oil reservoir chamber 323.

While specific examples of the chain tensioner according to the present invention have been described in the embodiments and variation examples above, the chain tensioner according to the present invention is not limited to these examples, and the shapes, positions, sizes, and positional relationships with each other of various constituent parts may be modified in various manners, or variously combined as appropriate.

In various embodiments and variation examples described above, illustrations in which the plunger protrudes upwards were used and the plunger was described to protrude in this direction, but the plunger may be arranged to protrude in any direction in accordance with the mode in which it is used.

In the second and third embodiments where there is an oil reservoir chamber, it is preferable to dispose the chain tensioner such that the oil reservoir chamber is located above the check valve. The relief valve will then be located above the oil pressure chamber and the chain tensioner can have enhanced robustness with respect to air leak possibilities.

The chain tensioner of the present invention may not necessarily be applied to a chain guide mechanism that uses a guide shoe for slidably guiding a transmission chain such as an endless roller chain passing over respective sprockets of a crankshaft and a cam shaft in an engine room, but may also be adopted in applications where the chain is slidably guided directly by the distal end of the plunger.

The chain tensioner may not necessarily be applied to a chain transmission mechanism but also used for similar transmission mechanisms that use belts, ropes and the like, and can be applied in a variety of industrial fields.

What is claimed is:
1. A chain tensioner comprising:
a tensioner body that has a cylindrical plunger bore with an open end;
a cylindrical plunger that is slidably inserted into the plunger bore;

biasing means, accommodated so as to freely expand and contract inside an oil pressure chamber formed between the plunger bore and the plunger, for biasing the plunger in a protruding direction of the plunger;

a check valve unit that suppresses reverse flow of oil flowing into the oil pressure chamber; and a relief valve unit that releases the oil when pressure inside the oil pressure chamber reaches or exceeds a predetermined high pressure, the check valve unit being disposed as a valve element of the relief valve unit, and the relief valve unit and the check valve unit being formed integral with each other, wherein the relief valve unit includes: a relief sleeve that slidably holds therein the check valve unit; a relief valve seat that opens and closes as the check valve unit slides; and a unit pressing mechanism that presses the check valve unit toward the relief valve seat, and wherein the relief sleeve includes a release section that is on a rear side of the relief valve seat and that causes the oil, which is released when the pressure reaches or exceeds a predetermined high pressure, to flow toward an outer circumferential surface of the relief sleeve.

2. The chain tensioner according to claim 1, wherein the check valve unit includes a check ball, a retainer holding therein the check ball, and a check valve seat that opens and closes as the check ball sits thereon and separates therefrom, and the retainer is configured to sit on the relief valve seat of the relief valve unit.

3. The chain tensioner according to claim 1, wherein the relief valve unit is disposed on a bottom part of the plunger bore, with the relief valve seat being oriented toward the plunger.

4. The chain tensioner according to claim 3, wherein the relief valve unit is disposed slidably inside the plunger, with the relief valve seat of the relief valve unit being oriented toward a direction in which the plunger protrudes.

5. The chain tensioner according to claim 1, wherein the plunger includes an oil reservoir chamber which communicates with an oil supply hole, the relief valve unit is disposed inside the oil reservoir chamber, and an oil passage is formed between an outer circumference of the relief sleeve and an inner circumference of the plunger to cause the released oil to circulate back to the oil reservoir chamber.

6. The chain tensioner according to claim 5, wherein the relief valve unit is formed to extend over the entirety of the oil reservoir chamber, and an oil reservoir space is formed inside the relief sleeve.

7. The chain tensioner according to claim 6, wherein the relief sleeve includes a sleeve connection hole in a rear side face of a sliding range of the check valve unit, the sleeve connection hole connecting the outer circumference of the relief sleeve with the oil reservoir space on the inner side of the relief sleeve.

8. A relief valve unit incorporated in a chain tensioner, comprising:

a relief sleeve that slidably holds therein a check valve unit; a relief valve seat that opens and closes as the check valve unit slides; and a unit pressing mechanism that presses the check valve unit toward the relief valve seat, wherein the relief sleeve includes a release hole that is provided on a rear side of the relief valve seat and causes released oil to flow out toward an outer circumferential surface of the relief sleeve.

9. The relief valve unit according to claim 8, wherein the check valve unit includes a check ball, a retainer holding therein the check ball, and a check valve seat that opens and closes as the check ball sits thereon and separates therefrom, and the retainer is configured to sit on the relief valve seat.

* * * * *